United States Patent [19]
Langen

[11] 3,923,144
[45] Dec. 2, 1975

[54] INTERMITTENT LOAD ACCUMULATOR

[75] Inventor: Marinus J. M. Langen, Rexdale, Canada

[73] Assignee: H. J. Langen & Sons Ltd., Rexdale, Canada

[22] Filed: Mar. 18, 1974

[21] Appl. No.: 451,726

[52] U.S. Cl................................ 198/31 AB; 198/24
[51] Int. Cl.².......................................... B65G 47/26
[58] Field of Search......... 198/31 R, 31 AA, 31 AB, 198/24

[56] References Cited
UNITED STATES PATENTS
| | | | |
|---|---|---|---|
| 1,243,407 | 10/1917 | Hawthorne | 198/31 AA X |
| 1,510,717 | 10/1924 | Straight | 198/31 AA X |
| 2,708,021 | 5/1955 | Meyer | 198/31 AB X |

FOREIGN PATENTS OR APPLICATIONS
| | | | |
|---|---|---|---|
| 765,013 | 1/1957 | United Kingdom | 198/31 AB |

Primary Examiner—James B. Marbert
Assistant Examiner—Douglas D. Watts
Attorney, Agent, or Firm—Fetherstonhaugh & Co.

[57] ABSTRACT

A carton loading machine includes an intermittent load accumulator for arranging a plurality of load units. A first conveyor is provided for feeding load units in a single file row to an accumulator station. A second conveyor is mounted for movement through the accumulator station and has a plurality of guide rails mounted thereon which extend transversely thereof to divide the second conveyor into a plurality of longitudinally spaced transversely extending load receiving slips which are alignable with the first conveyor whereby a row of load units may be fed into each slip. A drive is provided for intermittently moving the second conveyor to move each slip in turn into alignment with the first conveyor. A pusher bar is disposed above the second conveyor and mounted for movement transversely of the second conveyor. The pusher bar has a plurality of segment extending in a longitudinal direction of the second conveyor, each segment being spaced from its adjacent segment in the direction of the transverse extent of the second conveyor a distance equal to the width of the required load configuration. A loading platform is disposed in an edge-to-edge side-by-side relationship with respect to the second conveyor to receive the accumulated load. A carton loading pusher unit is mounted to reciprocate above the loading platform.

1 Claim, 4 Drawing Figures

INTERMITTENT LOAD ACCUMULATOR

FIELD OF INVENTION

This invention relates to load accumulators, In particular, this invention relates to an intermittent accumulator suitable for use in a carton loading machine.

PRIOR ART

In high speed carton loading machinery, the limiting factor in the speed of operation may be the speed at which the plurality of load units are assembled into the configuration required for loading. Various attempts have been made to line up the load units on the continuously moving conveyor using a series of dividers for dividing up units into side by side rows as they move along the conveyor. Difficulty has been experienced with this type of load accumulator resulting from the fact that there is a considerable amount of uncontrolled movement of the load units with respect to the conveyor on which they are supported and the load units can become interlocked with one another in such a way that they do not form the required load configuration. The device of the present invention overcomes this difficulty by receiving the load unit in an orderly row from a feeder mechanism and thereafter carefully and accurately controlling the positions of the load units on the accumulator conveyor.

SUMMARY OF INVENTION

According to an embodiment of the present invention, the load accumulator consists of an accumulator platform onto which the row of load units is directed from the feeder mechanism to extend transversely of the platform. Movement of the load units longitudinally of the platform is effected by means for intermittently moving the load units in the direction of the longitudinal extent of the platform in a plurality of steps of a length at least equal to the width of the row initially fed onto the platform. A transverse pusher is disposed above the platform and mounted for transverse movement with respect to the platform. The pusher means has a plurality of pusher surfaces which have a combined longitudinal extent equal to the longitudinal extent of the assembled load. The pusher surfaces are spaced from one another in the direction of the transverse extent of the platform a distance equal to the transverse width of the assembled load configuration. A control means is provided for effecting the longitudinal and transverse movements in sequence whereby an assembled load is discharged transversely from a platform following each longitudinal advance of the load units in the direction of the longitudinal extent of the platform.

PREFERRED EMBODIMENT

The invention will be more clearly understood after reference to the following detailed specification read in conjunction with the drawings wherein FIG. 1 is a pictorial view illustrating a load accumulator positioned to receive a load from a feeding mechanism and to discharge a load into a carton loading station;

Figure 1:
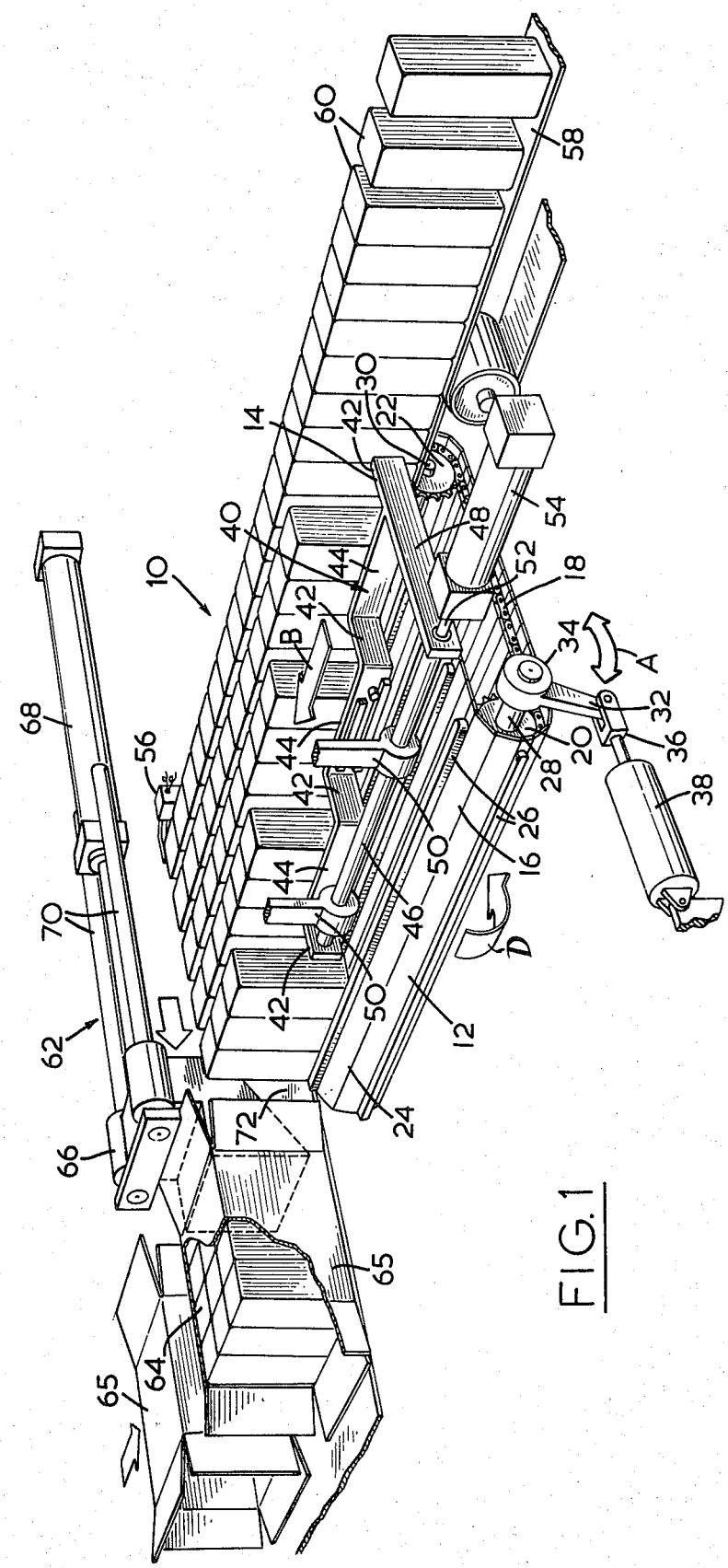

With reference to the drawings, the reference numeral 10 refers generally to a load accumulator according to an embodiment of the present invention. The load accumulator 10 consists of an endless conveyor 12 and a transverse pusher member 14.

The conveyor 12 consists of a plurality of transversely extending straps 16 mounted on support chains 18, only one of which is shown. The chains 18 extend around sprockets 20, 22. The surface of the conveyor 12 is sub-divided into a plurality of slips 24 by means of guide rails 26 which extend across the transverse width of the conveyor. The slips 24 are open at either end so that articles may pass into and out of the slips. The sprockets 22 and 24 are mounted on shafts 28 and 30 respectively. A lever arm 32 is mounted on one end of the shaft 28. A ratchet mechanism is incorporated in the boss 34 of the lever arm 32 whereby the lever arm 32 is connected to the shaft 28 to provide rotation of the shaft 28 in response to movement of the arm 32 to an fro in an arc. The arm 32 is connected to the end of a reciprocating shaft 36 of the hydraulic cylinder 38. The hydraulic cylinder 38 is suitably mounted on the accumulator support frame (not shown) so that the shaft 36 may be reciprocally driven to cause the shaft 28 to rotate in the direction of the arrow A. The extent of movement of the shaft 28 is sufficient in each reciprocation of the hydraulic cylinder 38 to cause the conveyor 12 to move a length equal to the pitch length of the slips 24.

The transverse pusher member 14 consists of a step-shaped pusher bar 40 which has pusher segments 42 extending across each of several slips 24 and the segments 42 are connected by portions 44 which extend in the direction of the transverse extent of the conveyor in alignment with the transverse guide rails 26. The number of pusher segments 42 will be determined by the number of load units in the direction of the longitudinal extent of the accumulator conveyor which are to be discharged and the length of the elements 44 will be determined by the number of load units in the transverse direction of the conveyor which are to be discharged at each reciprocal movement of the pusher unit. The pusher member 14 also includes a shaft 46 which extends between the foremost pusher segment 42 and an extension 48 of the last pusher unit. The shaft 46 is slidably mounted in hangers 50 which serve to support the pusher unit for reciprocation above the upper extent or platform portion of the conveyor 12. The hangers 50 depend from a suitable support frame (not shown). The pusher member 14 is secured to the end of a drive shaft 52 of a hydraulic cylinder 54. The hydraulic cylinder 54 is operable to move the pusher unit 14 from the retracted position shown in FIG. 1 to the extended position shown in FIG. 3.

A microswitch 56 is arranged in alignment with one of the first horizontally extending slips of the conveyor 12. The microswitch 56 serves to control the sequential operation of hydraulic cylinders 54 and 38. A feeder conveyor 58 is aligned with the microswitch 56 so as to feed a plurality of load units 60 into the first slip and into engagement with the microswitch 56.

A carton loader mechanism generally identified by the reference numeral 62 serves to load the accumulated load 64 formed in the accumulator into suitable end loading cartons 65 or the like. The end loader mechanism 62 includes an end load pusher 66 which is reciprocally driven by means of a hydraulic cylinder 68. The pusher 66 is slidably mounted on support bars 70 for movement to and fro across a loading platform 72.

In the embodiment illustrated in the drawings, a plurality of load units 60 are arranged in an assembled load configuration measuring three load units in the direction of the transverse extent of the conveyor and four load units in the direction of the longitudinal extent of the conveyor, forming a total load of twelve units. It will, of course, be understood that the configuration of the accumulated load may be varied by altering the form of the pusher unit 40 by increasing or decreasing the total number of pusher segments 42 and by increasing or decreasing the length of the spacer sections 44. It is important, however, that the spacer sections 44 be of equal length.

Figure 3:
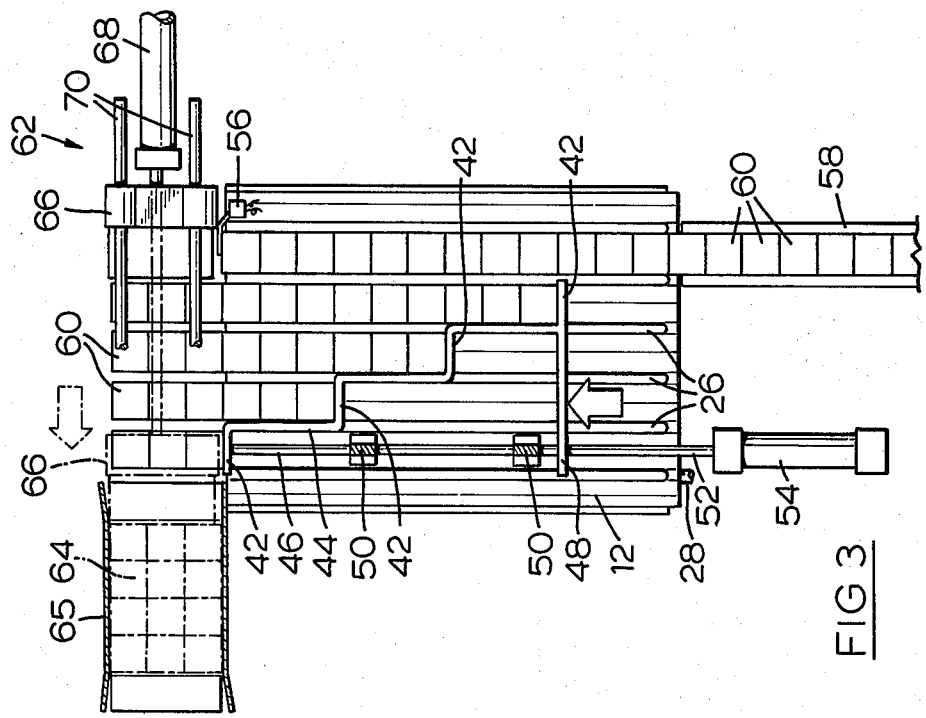
FIG. 3 is a plan view similar to FIG. 2 showing the pusher unit in the advanced position.
Figure 2:
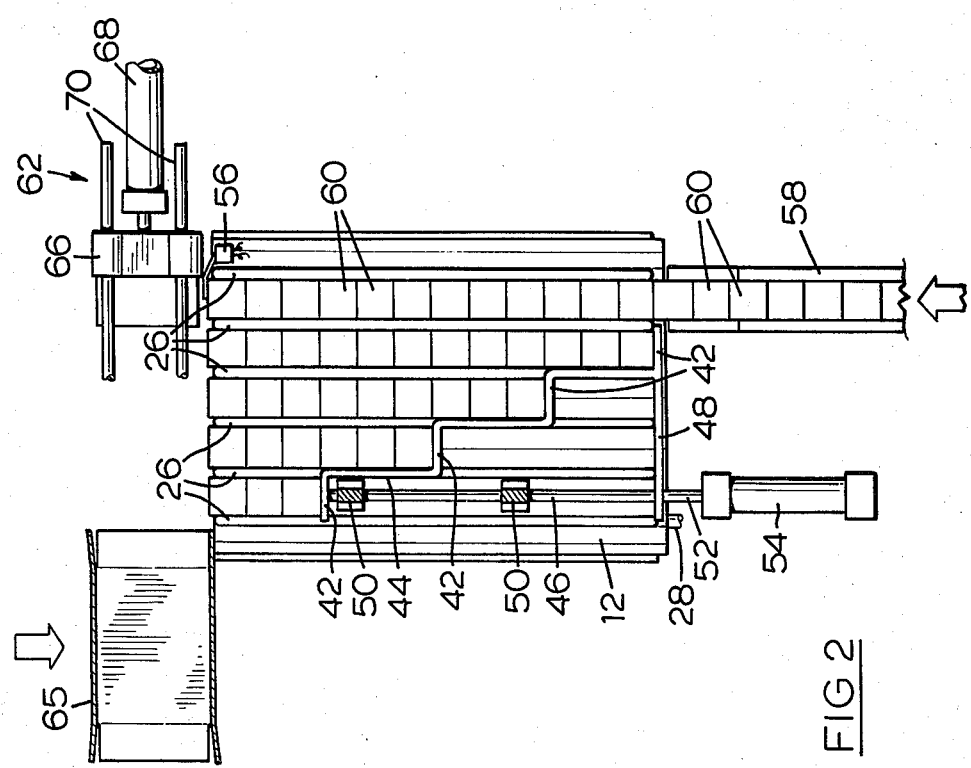
FIG. 2 is a diagrammatic plan view of a load accumulator with a pusher unit located in the retracted position.
Figure 4:
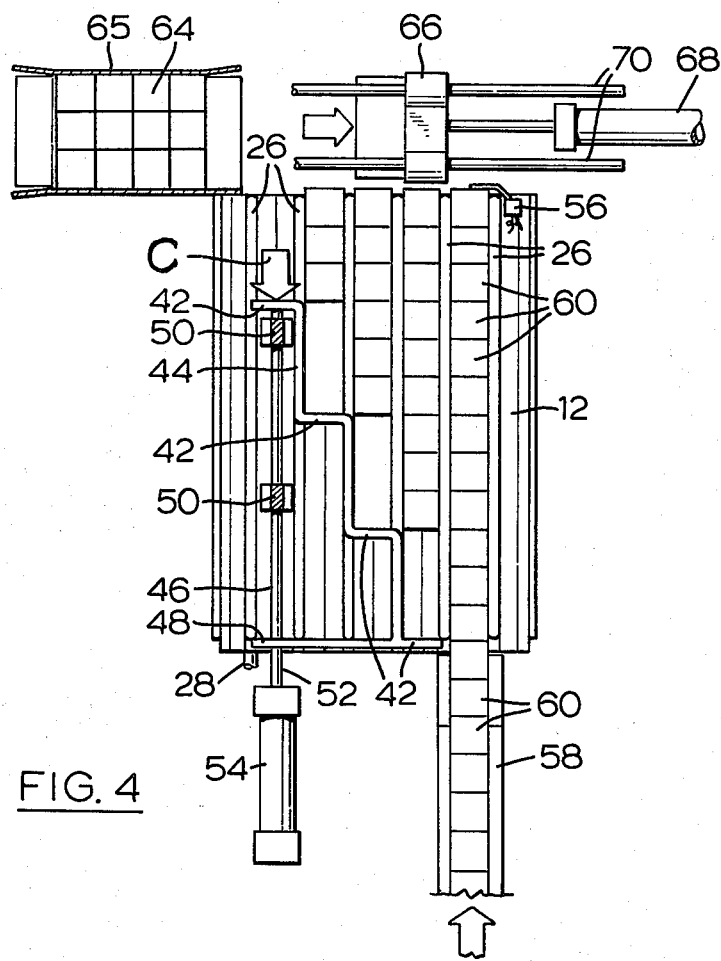
FIG. 4 is a plan view similar to FIG. 2 showing the pusher unit in the retracted position before the load units are longitudinally advanced by the conveyor.

In use, the accumulator slips which are in advance of the first slip may be hand-loaded to provide the loaded configuration illustrated in FIGS. 1 and 2 of the drawings. Under this condition the load units 60 are driven by the conveyor 58 along the first slip 24 into engagement with the microswitch 56 which is actuated by the load unit 60 and causes the hydraulic cylinder 54 to be activated to cause the pusher member 40 to move in the direction of the arrow B so as to cause twelve load units to move longitudinally of their slips to move off the accumulator platform formed by the conveyor 12 onto the loading platform 72 as shown in FIG. 3 of the drawings. The pusher member 40 then reverses its direction and moves in the direction of the arrow C to the retracted position shown in FIG. 4 of the drawings. In this position, there is a space between the pusher segments 42 and the load units located in the slip across which the segments 42 extend which is sufficient to permit the conveyor 12 to move longitudinally in the direction of the arrow D. Longitudinal movement in the direction of the arrow D is achieved as previously described by activating the hydraulic cylinder 38. Movement of the conveyor 12 in the direction of the arrow D fully loads each slip which is aligned with a pusher segment while emptying the first slip which is aligned with the feeder conveyor 58. This configuration is illustrated in FIG. 2 of the drawings. The feeder conveyor 58 then serves to refill the first slip 24 and when this has been achieved, the microswitch 56 is again activated to repeat the cycle described above.

After the prearranged load has been discharged onto the loading platform 72, it is loaded into an end loading carton 66 or the like by means of the end loader mechanism 62 so that the platform 72 is cleared to receive a further prearranged load of load unit 60 as previously described.

From the foregoing it will be apparent that the load accumulator of the present invention provides a simple and efficient apparatus whereby a plurality of load units arranged in a single file row may be rearranged into a plurality of side by side rows for loading into a carton or the like. The mechanism achieves the required arrangement in response to two simple movements. It will be noted that a complete load configuration is obtained and discharged in response to one longitudinal step motion of the conveyor and one to and fro reciprocation of the pusher member.

Various modifications of the present invention will be apparent to those skilled in the art without departing from the scope of the invention. For example, the load units 60 may be fed to the accumulator in two side by side rows, in which case they would be fed into two side by side slips on the accumulator platform and each pusher segment 42 would have a length in the direction of the longitudinal extent of the platform equal to that of two slip pitch lengths. These and other advantages of the present invention will be apparent to those skilled in the art.

What I claim as my invention is:

1. In a carton loading machine having a loading station in which a plurality of load units arranged in a required side by side load configuration are loaded into a carton, an accumulator station in which the load units are arranged in the required load configuration and transferred to the loading station, the improvement of first conveyor means for feeding load units in a single file row;

a. a second conveyor mounted for movement of an upper face thereof at right angles to said first conveyor, said second conveyor having a back end, a front end and a pair of oppositely disposed side edges, transversely extending guide rails mounted on said second conveyor and extending transversely of said second conveyor to divide said second conveyor into a plurality of longitudinally spaced transversely extending load unit receiving slips which are open at each side edge of the conveyor, said slips being alignable with said first conveyor adjacent the back end of said second conveyor whereby a row of load units may be fed into each slip, b. means for intermittently moving said second conveyor longitudinally of itself in the direction from said back and towards said front end to move each slip in turn into alignment with said first conveyor, c. pusher bar means disposed above said second conveyor and mounted for movement transversely of said second conveyor, said pusher bar means having a plurality of segments extending in the longitudinal direction of said second conveyor means, each of said segments extending across a slip, each segment being spaced from its adjacent segment in the direction of the transverse extent of said second conveyor a distance equal to the width of the required load configuration, d. means for moving said pusher bar means transversely of said second conveyor to and from a first retracted position to receive a row of load units advanced by said longitudinal movement of said second conveyor and a second extended position in which an accumulated load is discharged from the other side edge of said conveyor, said longitudinal and transverse movements being effected in sequence whereby an assembled load is discharged transversely of said conveyor following each longitudinal advance of said conveyor, e. a loading platform disposed in an edge-to-edge side-by-side relationship with respect to said other side edge of said second conveyor to receive the accumulated load which is discharged from said second conveyor, and f. carton loading pusher means mounted to reciprocate above said loading platform in the direction of movement of said first conveyor means to move an accumulated load into a position filling a carton.

\* \* \* \* \*